US006873317B1

(12) United States Patent
Griffin et al.

(10) Patent No.: US 6,873,317 B1
(45) Date of Patent: Mar. 29, 2005

(54) HAND-HELD ELECTRONIC DEVICE WITH A KEYBOARD OPTIMIZED FOR USE WITH THE THUMBS

(75) Inventors: Jason T. Griffin, Waterloo (CA); John A. Holmes, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 156 days.

(21) Appl. No.: 09/663,972

(22) Filed: Sep. 19, 2000

Related U.S. Application Data

(63) Continuation-in-part of application No. 09/106,585, filed on Jun. 29, 1998, which is a continuation-in-part of application No. 29/089,942, filed on Jun. 26, 1998, now Pat. No. Des. 416,256.

(51) Int. Cl.[7] .................................................. G09G 5/00
(52) U.S. Cl. ........................ 345/168; 345/169; 345/170; 345/172
(58) Field of Search ................................ 345/168, 169, 345/170, 171, 172

(56) References Cited

U.S. PATENT DOCUMENTS

| | | |
|---|---|---|
| 4,029,915 A | 6/1977 | Ojima |
| 4,449,839 A | 5/1984 | Bleuer |
| D278,341 S | 4/1985 | Scheid |
| D293,241 S | 12/1987 | Wan et al. |
| D312,628 S | 12/1990 | Yokoi et al. |
| D313,401 S | 1/1991 | Tanabe |
| D313,413 S | 1/1991 | Langton |
| 5,059,048 A | 10/1991 | Sirkin |
| 5,184,830 A | 2/1993 | Okada et al. |
| 5,217,295 A | 6/1993 | Tortola et al. |
| 5,288,158 A | 2/1994 | Matias |
| 5,336,001 A | * 8/1994 | Lichtenberg ................ 345/168 |
| 5,337,346 A | 8/1994 | Uchikura |
| 5,360,280 A | 11/1994 | Camacho et al. |
| 5,367,298 A | 11/1994 | Axthelm |
| 5,410,141 A | 4/1995 | Koenck et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,457,454 A | 10/1995 | Sugano |

(Continued)

FOREIGN PATENT DOCUMENTS

| | | |
|---|---|---|
| EP | 0267801 | 5/1988 |
| EP | 0278169 | 8/1988 |
| EP | 0538020 | 4/1993 |
| EP | 0685801 | 12/1995 |
| EP | 0732646 | 9/1996 |
| EP | 0760291 | 3/1997 |
| EP | 1143327 | 10/2001 |
| WO | 9833111 | 7/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |

*Primary Examiner*—Matthew C. Bella
*Assistant Examiner*—Tam Tran
(74) *Attorney, Agent, or Firm*—Jones Day; Krishna K. Pathiyal; Robert Liang

(57) ABSTRACT

A hand-held electronic device with a keyboard optimized for use with the thumbs is disclosed. In order to operate within the limited space available on a hand-held electronic device, the present invention optimizes the placement and shape of the keys, preferably using keys that are oval or oblong in shape, and that are preferably placed at angles designed to facilitate thumb-typing. The angles at which keys on either side of the keyboard are placed is complimentary.

31 Claims, 13 Drawing Sheets

U.S. PATENT DOCUMENTS

| | | | |
|---|---|---|---|
| D367,043 S | | 2/1996 | Ross et al. |
| 5,500,643 A | * | 3/1996 | Grant .......................... 345/168 |
| 5,543,787 A | | 8/1996 | Karidis et al. |
| 5,563,631 A | | 10/1996 | Masunaga |
| 5,575,576 A | | 11/1996 | Roysden, Jr. |
| 5,600,790 A | | 2/1997 | Barnstijn et al. |
| 5,606,712 A | | 2/1997 | Hidaka |
| 5,611,031 A | | 3/1997 | Hertzfeld et al. |
| D381,021 S | | 7/1997 | Williams et al. |
| 5,659,307 A | | 8/1997 | Karidis et al. |
| 5,661,605 A | | 8/1997 | Conway |
| D383,756 S | | 9/1997 | Henderson et al. |
| 5,672,108 A | | 9/1997 | Lam et al. |
| D386,497 S | | 11/1997 | Huslig et al. |
| 5,689,253 A | | 11/1997 | Hargreaves et al. |
| D390,509 S | | 2/1998 | Antzinas et al. |
| 5,737,394 A | | 4/1998 | Anderson et al. |
| 5,786,776 A | | 7/1998 | Kisaichi et al. |
| D397,369 S | | 8/1998 | Rissman |
| D397,728 S | | 9/1998 | Yuen et al. |
| D399,537 S | | 10/1998 | Chi et al. |
| 5,818,437 A | | 10/1998 | Grover et al. |
| 5,825,353 A | | 10/1998 | Will |
| 5,827,082 A | | 10/1998 | Laine |
| D402,572 S | | 12/1998 | Han |
| D403,362 S | | 12/1998 | Fai |
| 5,861,821 A | | 1/1999 | Kato et al. |
| 5,893,798 A | | 4/1999 | Stambolic et al. |
| 5,915,228 A | | 6/1999 | Kunihiro et al. |
| 5,920,308 A | | 7/1999 | Kim |
| 5,931,873 A | | 8/1999 | Cisar |
| 5,963,197 A | | 10/1999 | Bacon et al. |
| 5,966,098 A | * | 10/1999 | Qi et al. ..................... 343/702 |
| 5,974,238 A | | 10/1999 | Chase, Jr. |
| D416,256 S | | 11/1999 | Griffin et al. |
| 5,982,520 A | | 11/1999 | Weiser et al. |
| 5,995,026 A | | 11/1999 | Sellers |
| 6,005,496 A | | 12/1999 | Hargreaves et al. |
| 6,006,351 A | | 12/1999 | Peretz et al. |
| 6,009,333 A | | 12/1999 | Chaco |
| 6,014,429 A | | 1/2000 | LaPorta et al. |
| 6,014,573 A | | 1/2000 | Lehtonen et al. |
| D420,351 S | | 2/2000 | Waldner |
| 6,023,779 A | | 2/2000 | Fullam et al. |
| 6,047,047 A | | 4/2000 | Aldridge et al. |
| 6,047,196 A | | 4/2000 | Makela et al. |
| 6,049,796 A | | 4/2000 | Siitonen et al. |
| 6,052,070 A | | 4/2000 | Kivela et al. |
| 6,084,576 A | | 7/2000 | Leu et al. |
| 6,091,956 A | | 7/2000 | Hollenberg |
| 6,094,197 A | | 7/2000 | Buxton et al. |
| 6,102,594 A | | 8/2000 | Strom |
| 6,103,979 A | | 8/2000 | Motoyama et al. |
| 6,107,997 A | | 8/2000 | Ure |
| D432,511 S | | 10/2000 | Eckholm |
| D433,017 S | | 10/2000 | Martinez |
| D433,460 S | | 11/2000 | Griffin et al. |
| 6,148,261 A | | 11/2000 | Obradovich et al. |
| 6,157,323 A | | 12/2000 | Tso et al. |
| D436,591 S | | 1/2001 | Abston et al. |
| 6,212,412 B1 | | 4/2001 | Rogers et al. |
| D441,733 S | | 5/2001 | Do et al. |
| 6,243,789 B1 | | 6/2001 | Hasbun et al. |
| 6,278,442 B1 | | 8/2001 | Griffin et al. |
| 6,295,052 B1 | | 9/2001 | Kato et al. |
| 6,297,795 B1 | | 10/2001 | Kato et al. |
| 6,304,261 B1 | * | 10/2001 | Shields et al. .............. 345/358 |
| 6,304,431 B1 | | 10/2001 | Kim |
| 6,310,609 B1 | | 10/2001 | Morgenthaler |
| D451,079 S | | 11/2001 | Ali |
| D454,349 S | | 3/2002 | Makidera et al. |
| D454,849 S | | 3/2002 | Eckholm |
| 6,356,258 B1 | | 3/2002 | Kato et al. |
| 6,374,277 B2 | | 4/2002 | Vong et al. |
| D456,794 S | | 5/2002 | Laverick et al. |
| 6,385,463 B1 | | 5/2002 | Lieberman et al. |
| 6,396,482 B1 | | 5/2002 | Griffin et al. |
| D458,239 S | | 6/2002 | Shim et al. |
| D459,327 S | | 6/2002 | Ali |
| D460,068 S | | 7/2002 | Lanzaro et al. |
| D460,493 S | | 7/2002 | Griffin et al. |
| D461,803 S | | 8/2002 | Griffin et al. |
| 6,452,588 B2 | | 9/2002 | Griffin et al. |
| D464,995 S | | 10/2002 | Griffin et al. |
| 6,459,968 B1 | | 10/2002 | Kochie |
| 6,489,950 B1 | | 12/2002 | Griffin et al. |
| 6,507,336 B1 | | 1/2003 | Lunsford |
| D472,225 S | | 3/2003 | Griffin |
| 6,535,749 B1 | | 3/2003 | Iwata et al. |
| 6,538,651 B1 | | 3/2003 | Haymann et al. |
| D472,551 S | | 4/2003 | Griffin |
| D473,226 S | | 4/2003 | Griffin |
| D476,985 S | | 7/2003 | Griffin |
| D478,585 S | | 8/2003 | Griffin |
| 6,611,254 B1 | | 8/2003 | Griffin et al. |
| 6,611,255 B2 | | 8/2003 | Griffin et al. |
| D479,233 S | | 9/2003 | Griffin |
| D480,722 S | | 10/2003 | Griffin |
| 6,630,924 B1 | | 10/2003 | Peck |
| 6,647,367 B2 | | 11/2003 | McArthur et al. |
| 2001/0044828 A1 | | 11/2001 | Kikinis |

* cited by examiner

HAND-HELD ELECTRONIC DEVICE WITH A KEYBOARD OPTIMIZED FOR USE WITH THE THUMBS

CROSS-REFERENCE TO RELATED APPLICATIONS

This is a continuation-in-part of U.S. patent application Ser. No. 09/106,585 filed Jun. 29, 1998, entitled Hand-Held Messaging Device with a Keyboard Optimized for Use with the Thumbs, which is in turn a continuation-in-part of U.S. Design Application Ser. No. 29/089,942, entitled Hand-Held Messaging Device with Keyboard, filed Jun. 26, 1998 now U.S. Pat. No. Des. 416,256, and assigned to the assignee of the present invention.

BACKGROUND

The present invention is directed toward the field of small, hand-held electronic devices such as personal data assistants (PDAs), personal information managers (PIMs), two-way pagers and the like. In particular, the system and method of the present invention provide the user of the hand-held device with the ability to input data with a minimal amount of key strokes, and includes a keyboard structure that is optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys, and be optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email message or a similar text file that requires user-generated data, the present invention includes an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the present invention have discovered to be faster and more accurate in small hand-held electronic devices than touch-typing or "hunting and pecking" typing.

An additional feature of the invention is thus the use of an additional input means for control of functions that might otherwise be controlled by a keyboard that included function keys. To encourage data entry using thumbs and again to minimize the number of keys on the keyboard, the present invention also includes a thumb-wheel for control of menus to select forms and functions relevant to data input. The thumb-wheel is preferably positioned in close proximity to the keyboard to enable the easy transition from thumb-based typing to thumb control of forms and functions via the thumb-wheel.

In addition to hardware features that encourage optimal data entry through the use of thumbs, the present invention provides several software features that are designed to minimize keystrokes and aid data entry.

The features of this invention, both individually and collectively, have not, to the knowledge of the inventors, been applied to a small hand-held electronic device that requires user-generated data entry. To permit efficient operation of such devices, while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys having a characteristic length, for instance the side or diagonal of a polygon, the major or minor axis of an ellipse, or the diameter of a circle, preferably placed at an angle to optimize operation of the keyboard by the use of the thumbs.

There remains another need for a keyboard with key/s that are shaped and sized to maximize contact with the thumbs while minimizing the keyboard area required for such keys.

There also remains a need for an auxiliary input device that is to be operated by the thumb for data inputs of forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

SUMMARY

The present invention overcomes the problems no:ed above and satisfies the needs in this field for a hand-held electronic device with a keyboard optimized for use with the thumbs. In the preferred embodiment of the present invention, the hand-held electronic device is a two-way paging device that permits full-text, two-way messaging such as email messaging, and that includes standard PDA or PIM features, such as an address book, an electronic calendar, a task list and other text-based features. These features require user input of text strings that can be lengthy and that cannot be reduced to pre-determined or "canned" strings. Thus, for such a device, the efficient entry of data in a device meant to fit into the palm of one's hard requires that two goals are achieved. First, the data entry must be relatively easy from a user perspective. This means that the user must be somewhat familiar with analogous forms of data entry and does not have to be trained to use the data entry for the hand-held device. Second, the form factor does not permit a large number of keys or keys that are very large. Thus, efficient use of the keyboard space is required and functions that might be able to be performed by a standard keyboard are off-loaded to an auxiliary input device, such as a thumb-wheel, joystick, arrow keypad or telephone/numeric keypad, or are performed through a minimal number of keystrokes that encourage the use of thumb-based data entry. To accomplish these goals, the invention first optimizes the placement of the keys on the device keyboard.

In order to work within the limited space available for the keyboard, it was determined that it was preferable to use keys that were oval or oblong, as this shape is characteristic of the area of thumb-impact that a thumb makes with any flat surface held by the hand, and that were placed at angles characteristic of the complementary and opposable nature of the left and right thumbs, designed to facilitate use by thumb typing with both hands. An angle for the keys on the right side of the keyboard and a complementary angle for the keys on the left side of the keyboard are chosen based upon observation of the angle at which a user will orient his or her thumbs while thumb-typing. The optimal orientation of each key maximizes the surface area of the thumb-impact oval. The optimal shape of each key minimizes overall keyboard footprint. The optimal layout of the keys is in a radial fashion characteristic of the radial trajectories that are naturally taken by the tip of the thumb moved over the keyboard of the electronic device when held.

Alternatively, however, other keyboard designs could be employed using other shapes for the keys, other orientations, and other layouts Many shapes allow for an oval representing the area of thumb-impact to be circumscribed within it's boundaries at complementary angles depending on whether the key is on the left or right side of the keyboard. For instance, for a rectangular shaped key, an oval can be circumscribed in at least four ways: with major axis coinciding with the horizontal line bisecting the rectangle thru its center; with major axis coinciding with the vertical line bisecting the rectangle thru its center; and with major axis coinciding with either one of the two diagonals extending from opposite corners. Alternate shapes, orientations, and layouts are less efficient embodiments of a thumb-typing keyboard.

The invention also minimizes the number of keys available for data input. In the preferred embodiment, only keys for the 26 letters of the English alphabet are available on the keyboard, as well as a backspace key, a line feed key, an "alt" key, a "cap" key and a space bar. The alt key enables the user, in conjunction with the other keys, to input numbers and symbols to perform certain functions. The placement of the keys is designed to enhance the user experience while typing with the thumbs by meeting two seemingly opposite goals—minimizing the keyboard footprint while maximizing the likelihood that proper keys will be struck by the thumb-typing user.

To further limit the space occupied by the keyboard and facilitate thumb typing, the keys on the keyboard are preferably arranged in arced rows. In a preferred embodiment, the rows of keys have respective radii increasing from a lower row near the bottom of the keyboard towards an upper row near the top of the keyboard. The keyboard rows may also be concentric.

The respective keys in each arced row may be angled to a vertical reference bisecting the key, or may be oriented normal to the vertical reference. In addition, the keys in the respective arced rows may be oriented along a common set of vertical references, or they may be offset from each other.

The invention also provides additional incentive for the user to use thumb input by providing an input device adjacent to the keyboard, but integral to the overall hand-held device. Although other devices can be used in an auxiliary fashion, such as a thumb-wheel, arrow keypad or telephone/numeric keypad, the preferred device is a thumb-wheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumb-wheel in the preferred embodiment is placed vertically on the two-way paging device so that the user can easily move his or her thumb from the thumb-wheel to the keyboard and back for performing functions and retrieving data forms, such as an e-mail template or address book entry template, for data entry.

Additionally, various software techniques can be implemented to enhance the user's thumb-typing experience in using the device of the present invention. In the preferred embodiment, for example, the user can change the capitalization of a particular letter simply by keeping a key depressed for a particular length of time without an intermittent release being detected by the keyboard controller.

The primary advantage of the present invention is that it enables efficient and user-friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
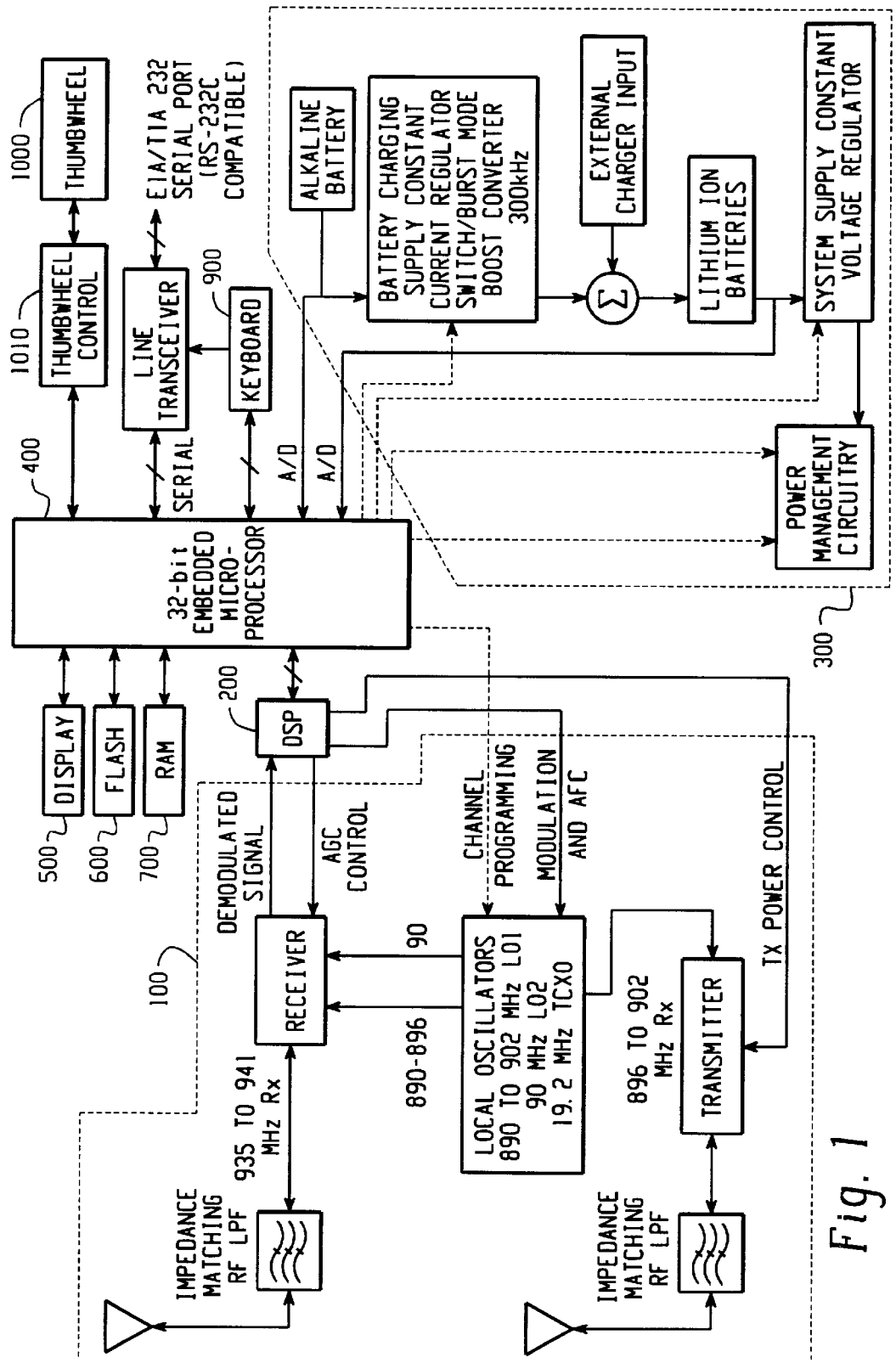
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, which controls the operation of the messaging device, display 500, which is preferably a full graphic LCD, FLASH memory 600, RAM 700, serial port 800, keyboard 900, thumb-wheel 1000 and thumb-wheel control logic 1010.

In its intended use, a message comes to the device via a wireless data network, such as the Mobitex network, into subsystem 100, where it is demodulated via DSP 200 and decoded and presented to microprocessor 400 for display on display 500. To access the display of the message, the user may choose from functions listed under a menu presented as a result of user interaction with thumb-wheel 1000. If the message is an email message, then the user may choose to respond to the email by selecting "Reply" from a menu presented on the display through interaction via thumb-wheel 1000 or via menu selection from keyboard 900. In typing the reply, the user can use keyboard 900 to type full text message replies, or insert pre-determined or "canned" responses by using either a particular keystroke pattern or through pulling down pre-determined text strings from a menu of items presented on display 500 through the use of thumb-wheel 1000.

When the reply to the message is composed, the user can initiate the sending of the message preferably by interaction through thumb-wheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumb-wheel 1000 can be used to initiate full-text messages or to forward messages to another party.

In addition, the keyboard 900 and thumb-wheel 1000 can be used to permit data entry to an address book resident on the messaging device, or an electronic calendar or log book, or any other function on the messaging device requiring data entry. Preferably, the thumb-wheel is a thumb-wheel with a push button SPST switch with quadrature signal outputs, such as that manufactured by Matsushita Electronic Components Co. Ltd. as part number EVQWK2001.

Figure 2:
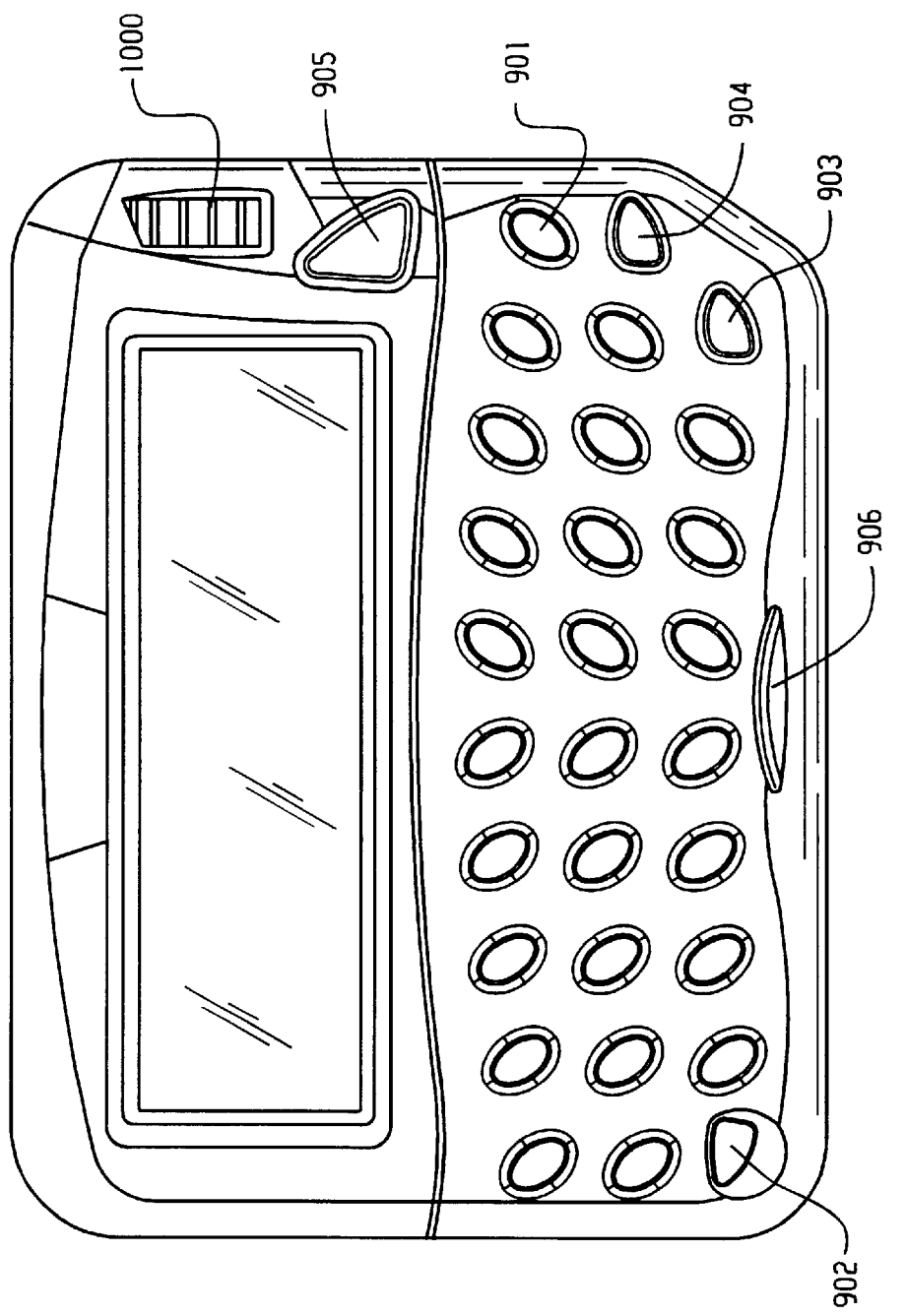
FIG. 2 is a frontal view of the hand-held device showing the shape and placement of the keys on the keyboard and the auxiliary input device.

FIG. 2 is a front view of messaging device 10 that incorporates the invention. Shown in FIG. 2 are a plurality of letter keys 901, specialized keys 902, 903, 904 and 905, and space bar 906. Also shown is thumb-wheel 1000 in its vertical orientation arid in association with display 500 and keyboard 900. In the preferred embodiment, key 902 is the alt key, key 903 is the cap key, key 904 is the line feed key, and key 905 is the backspace key. Other configurations of these keys are also possible.

FIG. 2 also shows the arrangement of keys on the keyboard into multiple rows. Each of the rows defines an arc along which the keys are positioned. Such an arrangement of the keys not only facilitates thumb typing by a user but also reduces the space occupied by the keyboard. The arced rows of keys shown in FIG. 2 allow for location of the space bar 906 in its conventional keyboard position but reduce the amount of unoccupied space at the ends of the space bar.

Figure 3:
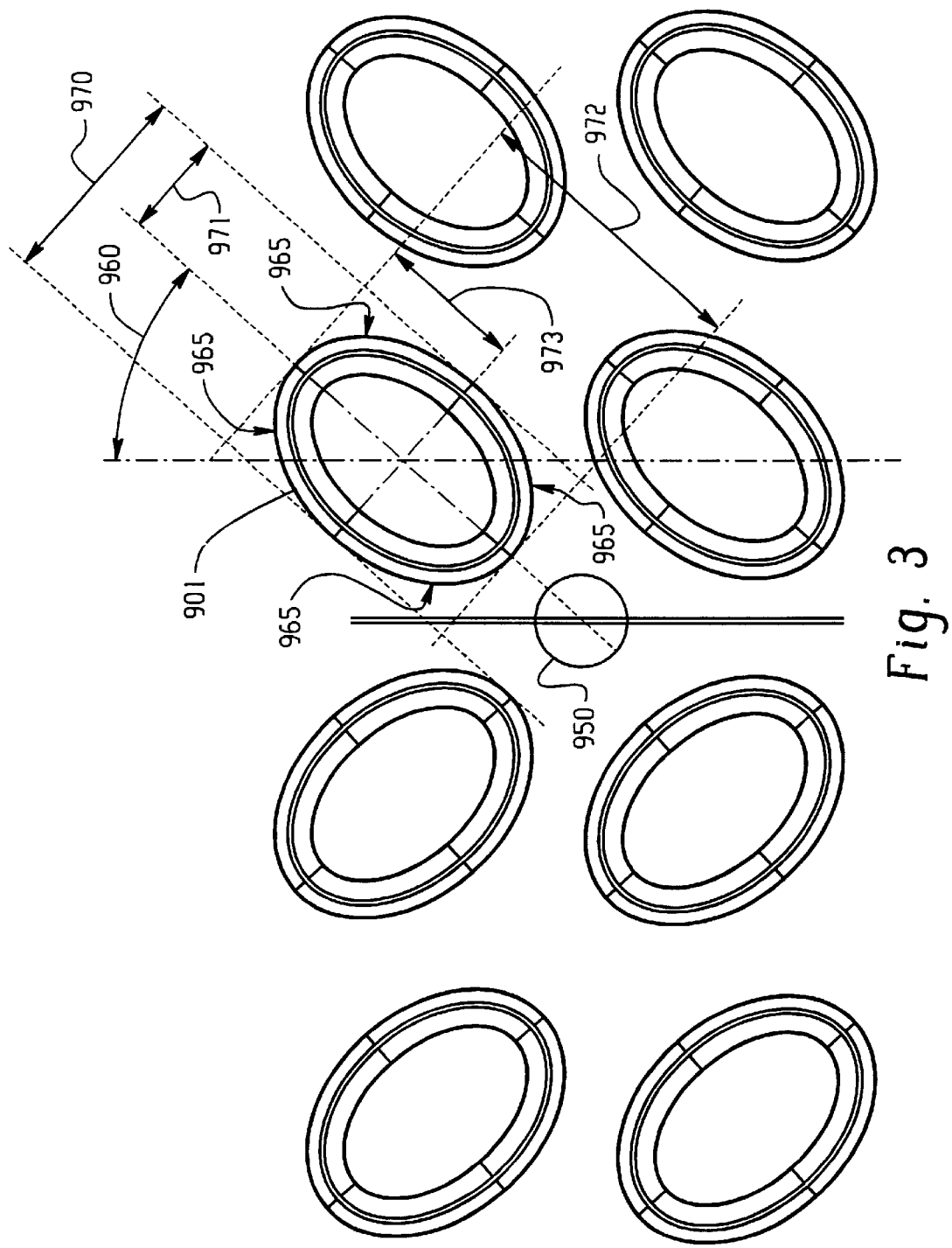
FIG. 3 is a diagram of showing the shape, size and placement of the keys on the keyboard.

Although FIG. 2 shows a preferred embodiment of a messaging device 10, other implementations incorporating alternate device architectures are also contemplated. For example, different curvatures of the arced rows could be employed to accommodate keys on the keyboard between rows either in addition to or instead of only at the bottom of the keyboard in the position of the space bar shown in FIG. 2. In addition, many different shapes and orientations of the keys could also be utilized, as is further detailed below with respect to FIGS. 5–12. Similar keyboard layouts would also be suitable for use in other electronic devices with different display arrangements. Electronic devices having clamshell type designs, such as the Research in Motion (RIM™) Inter@ctive™ Pager, in which the display is positioned on a movable cover portion of the device which is attached to the keyboard portion with a hinge, represent one such alternate keyboard/display arrangement. It is well within the scope of the present invention to include the inventive keyboard on a variety of handheld electronic devices such handheld electronic arcade devices; two-way pagers; wireless data communication devices; cell phones; and Personal FIG. 3 is a view of a subset of the letter keys 901, showing the preferred dimensions and relative positions of the keys. Also shown is the point 950 that marks the center of keyboard 900, key dimensions 970, 971, 972 and 973, as well as angle 960 and the rho value 965, representing curvature of a letter key 901. A rho value is a ratio commonly used by persons skilled in the art to define the shape factor of a curve. In investigating optimal key placement on the keyboard, it was determined that the keys should be placed at an angle 960 relative to a vertical reference bisecting the key that facilitated easy typing using thumbs. That angle is preferably positive 40 degrees relative to the vertical reference for keys on the right side of the keyboard (where 950 is the center of the keyboard), and negative 40 degrees for the keys on the left side of the keyboard. However, complementary angles ranging from 20 degrees to 70 degrees could also be used to accomplish the goal, albeit less optimally, or facilitating thumb typing.

As is also shown on FIGS. 2 and 3, the keys 901 are dispersed across keyboard 900 evenly so that there is sufficient space between the keys to decrease the opportunity for multiple keys being depressed while thumb typing. Additionally, the keys 901 are sized appropriately given the footprint of the messaging device and the keyboard 900. In its preferred embodiment, the messaging device 10 measures 64 mm by 89 mm across its face, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of 0.414, although values may range higher or lower. Other rho values will lead to an acceptable, but not as optimal, or aesthetically pleasing, shape of keys 901. As to the key dimensions, the width 970 of the key 901 is 4.8 millimeters (971 representing the radius of half that value, 2.4 mm) and the length (or height) 972 of the key 901 is 7 millimeters (973 representing the radius of half that value, 3.5 mm). Although oval is the preferred shape for keys 901, as shown in FIGS. 5–12, other shapes are also possible as they can circumscribe an oval representing the thumb-impact area.

One of the software features that aids in the device 10 being optimally used for thumb typing is a capitalization feature. Using this feature, if a user depresses a key 901, then the operating system detects a key down event. If the key is released after a period of time, the operating system detects a key up event. If, upon a key down event, a period of time elapses before a key up event is detected, then the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences.

Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
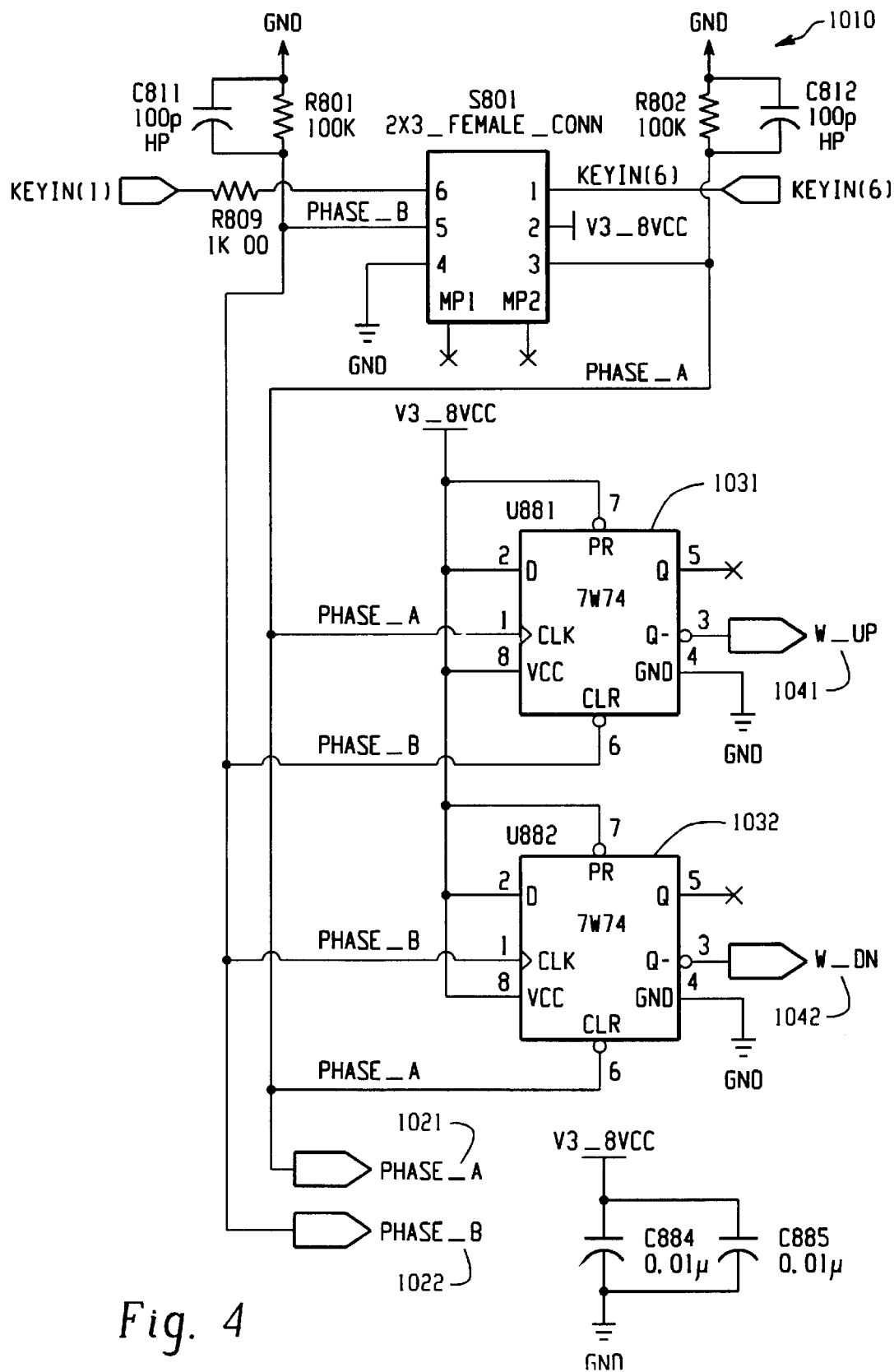
FIG. 4 is a diagram of the control circuitry for the thumb-wheel.

FIG. 4 is the logic circuitry 1010 associated with thumb-wheel 1000. Thumb-wheel 1000 outputs quadrature signals phase A 1021 and phase B 1022, which are processed by D flip-flops 1031 and 1032 to present signals 1041 W_UP and 1042 W_DN to microprocessor 300. Signals 1041 and 1042 represent, respectively, a user rolling the thumb-wheel up and rolling the thumb-wheel down.

Figure 5:
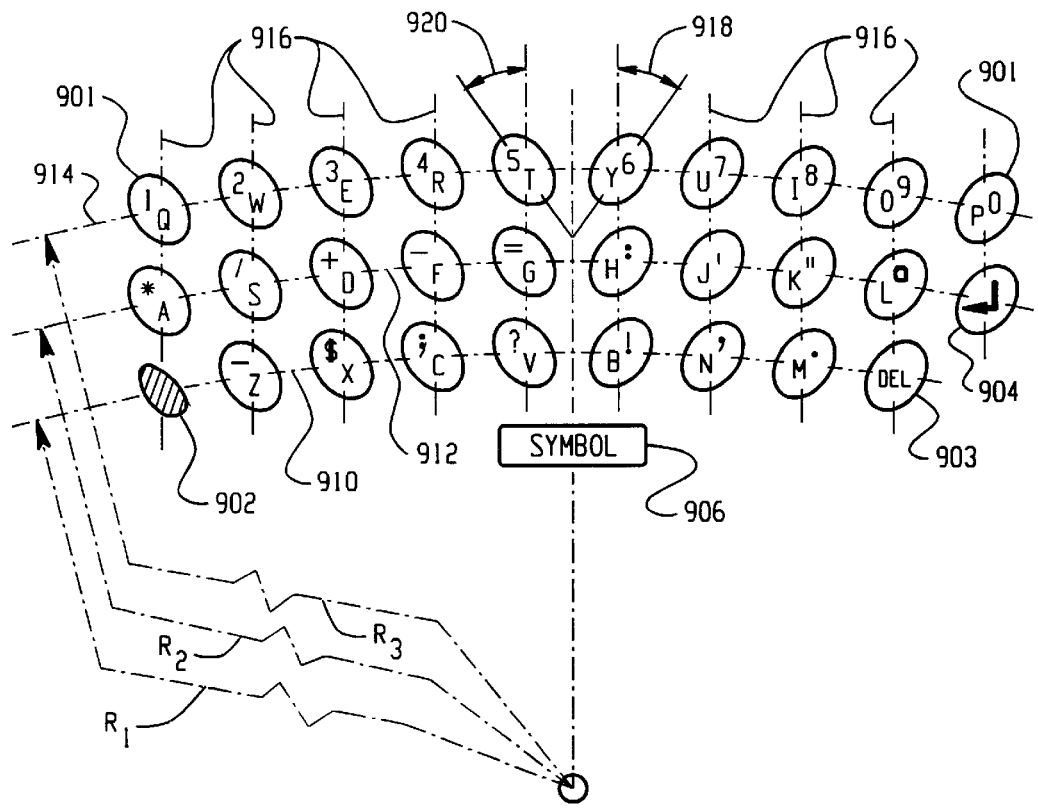
FIG. 5 is a diagram showing a first embodiment of a keyboard according to the present invention.

FIG. 5 is a diagram showing a first embodiment of a keyboard according to the present invention. This keyboard includes a plurality of letter keys 901 (A–Z), several function keys 902, 903, 904, and a spacebar/symbol selector 906. The respective keys 901 are preferably organized into three arced rows 910, 912, 914. The first arced row 910 includes the function keys 902, 903, and the letter keys 901 Z, X, C, V, B, N, and M, just like or the first row of a standard QWERTY keyboard. The degree of arcing of the first arced row 910 i:3 preferably defined by a first radius R1. The second arced row 912 includes the function key 904, and the letter keys 901 A, S, D, F, G, H, J, K and L, just like on the second row of a standard QWERTY keyboard. The degree of arcing of the second arced row 912 is preferably defined by a second radius R2. The third arced row 914 includes the letter keys 901 Q, W, E, R, T, Y, U, I, 0 and P, just like on the third row of a standard QWERTY keyboard. The degree of arcing of the third arced row 914 is preferably defined by a third radius R3.

For the preferred three-row organization shown in FIG. 5, the first radius R1 of the first arced row 910 is preferably less than the second radius R2 of the second arced row 912, which is preferably less than the third radius R3 of the third arced row 914. These radii R1, R2, R3 may define a set of concentric circles on which the arced rows of keys 910, 912, 914 are placed. Other configurations and orientations of the arced rows of keys are also possible.

Also shown in FIG. 5 are a set of vertical references 916. Each of these vertical references 916 bisects one or more (up to three) of the letter keys 901 making up the keyboard. In the embodiment shown in FIG. 5, the keys 901 are preferably oval-shaped, and are oriented at an angle with respect to the vertical references 916. The keys on the right-hand side of the keyboard are preferably oriented at a first predetermined angle 918, and the keys on the left-hand side of the keyboard are preferably oriented at a second predetermined angle 920. The first predetermined angle 918 is preferably a positive angle with respect to the vertical reference 916, and the second predetermined angle 920 is preferably a negative angle with respect to the vertical reference 916. These first and second predetermined angles 918, 920 are preferably complementary angles, for example +/−40 degrees from vertical. As discussed above, a range of angles is possible.

The keys 901 in FIG. 5 are also preferably aligned along the set of vertical references 916, such that a key in the first row is aligned with a key in the second row, which is aligned with a key in the third row. For example, the N key in the first row 910 is aligned with the J key in the second row 912 and the U key in the third row 914.

The optimal layout of the keys is in a radial fashion characteristic of the radial trajectories that are naturally taken by the tip of the thumb moved over the keyboard of the electronic device when held as shown in FIGS. 13a–13f. FIGS. 13a–13f illustrate sample movements of the thumbs over the keyboard. As shown, the thumbs of the user easily follow the circumferential paths 910, 912 and 914 and the vertical references 916 (shown in FIG. 5) to efficiently and quickly enter input to the small keyboard with his thumbs.

Figure 6:
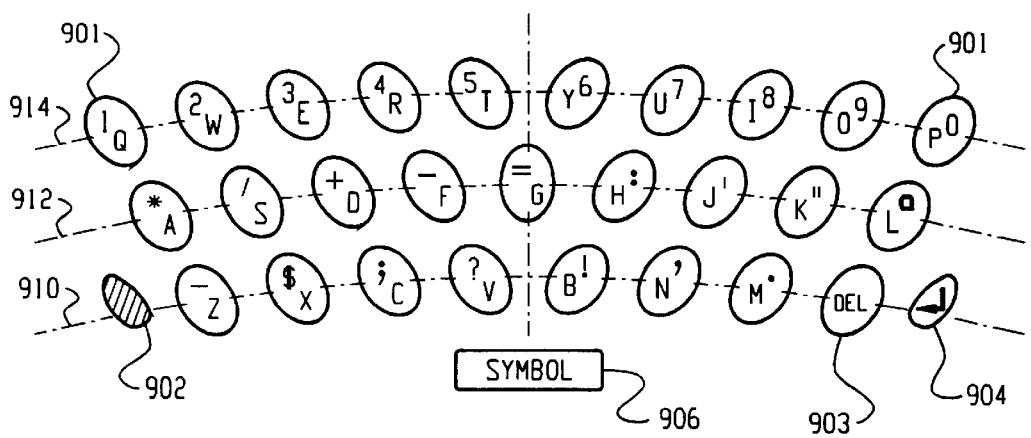
FIG. 6 is a diagram showing a second embodiment of a keyboard according to the present invention.
Figure 6A:
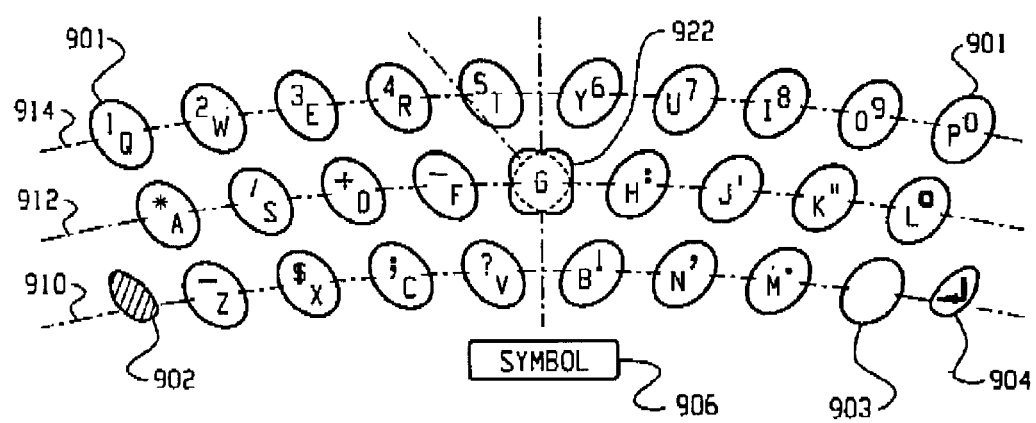
FIG. 6a is an alternative embodiment of the second embodiment illustrated in FIG. 6.

FIG. 6 is a diagram showing a second embodiment of a keyboard according to the present invention. This embodiment is similar to FIG. 5, except that the keys 901 in each arced row 910, 912, 914 are not aligned along the set of vertical references 916, but instead are staggered from one row to the next. Keys positioned along a vertical line passing through the center of the keyboard, such as the "G" key in FIG. 6 may be oriented such that an axis of symmetry of the shape coincides with the vertical line passing through the center of the keyboard, thereby allowing the key to be used as easily with the left as the right thumb. In the figure, although the "G" key was oriented with the major axis coinciding with a vertical, it could have been placed with the minor axis coinciding with the vertical. In another embodiment as shown in FIG. 6a, a special center key 922 has a vertically symmetrical key shape and orientation that is a combination of the left key shape and the right key shape: by superimposing the two shapes and tracing the exterior circumference as a central shape, the resulting shape can be used just as easily with the left or right thumb.

Figure 7:
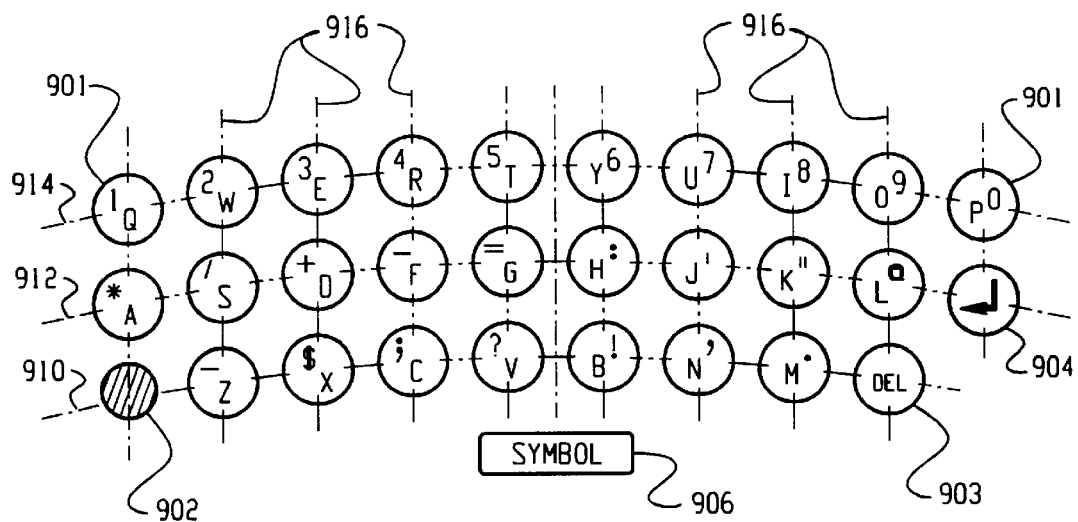
FIG. 7 is a diagram showing a third embodiment of a keyboard according to the present invention.

FIG. 7 is a diagram showing a third embodiment of a keyboard according to the present invention. This embodiment is similar to FIG. 5, except that the keys 901 in each arced row 910, 912, 914 are circular in shape instead of ovals. Because of the circular shape of the keys 901, the concept of orienting the keys 901 at the first and second predetermined angles 918, 920 is not applicable to this design. However, the concept of a circumscribed oval still applies, as in the case of a central key discussed above in reference to FIG. 6. It is possible to circumscribe a thumb-impact oval onto the keys with a major axis coinciding with a line going through the center of each circular key at an angle 918 and 920 for right sided keys and left sided keys respectively. Note that the keys 901 in FIG. 7 are also aligned along the set of vertical references 916.

Figure 8:
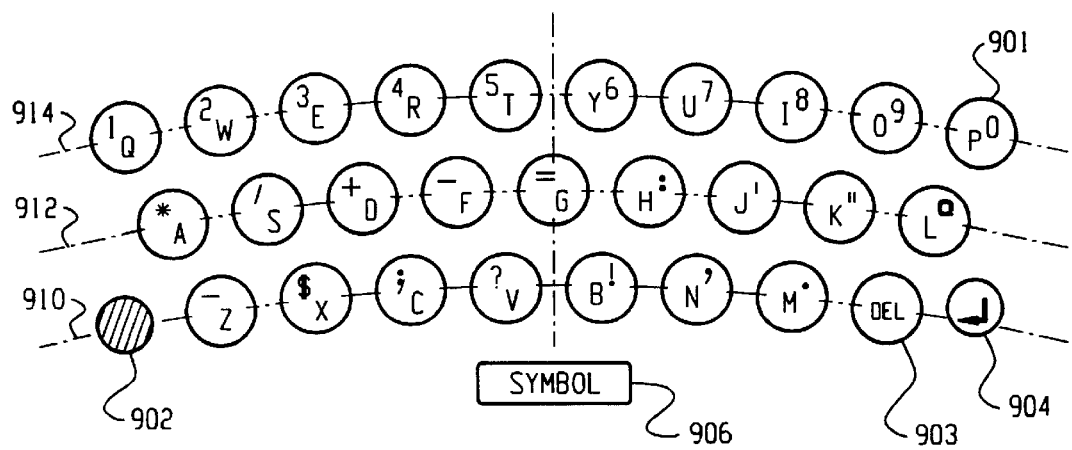
FIG. 8 is a diagram showing a fourth embodiment of a keyboard according to the present invention.

FIG. 8 is a diagram showing a fourth embodiment of a keyboard according to the present invention. This embodiment is similar to the embodiment shown in FIG. 7, except that the keys 901 in each arced row 910, 912, 914 are not aligned along the set of vertical references 916, but instead are staggered from one row to the next.

Figure 9:
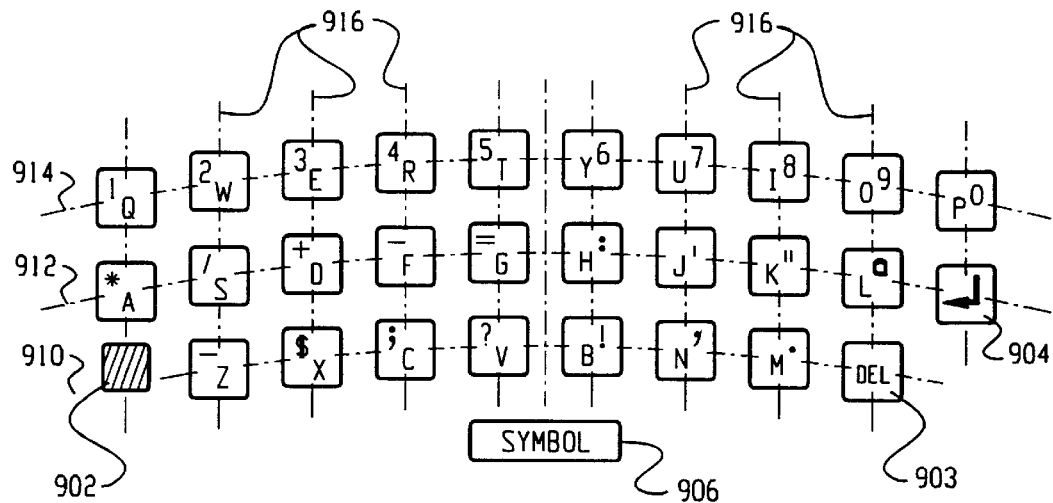
FIG. 9 is a diagram showing a fifth embodiment of a keyboard according to the present invention.

FIG. 9 is a diagram showing a fifth embodiment of a keyboard according to the present invention. This embodiment is similar to the embodiment shown in FIGS. 5 and 7, except that the keys are square instead of ovals or circles. The keys in FIG. 9 are also aligned along the set of vertical references 916.

Figure 10:
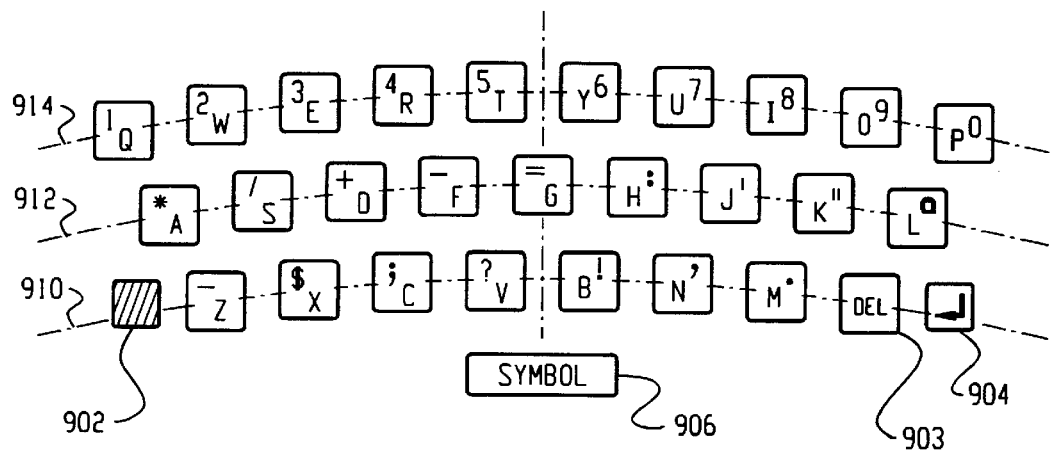
FIG. 10 is a diagram showing a sixth embodiment of a keyboard according to the present invention.

FIG. 10 is a diagram showing a sixth embodiment of a keyboard according to the present invention. This embodiment is similar to the embodiment shown in FIG. 9, except that the keys 901 in each arced row 910, 912, 914 are not aligned along the set of vertical references 916, but instead are staggered from one row to the next.

Figure 11:
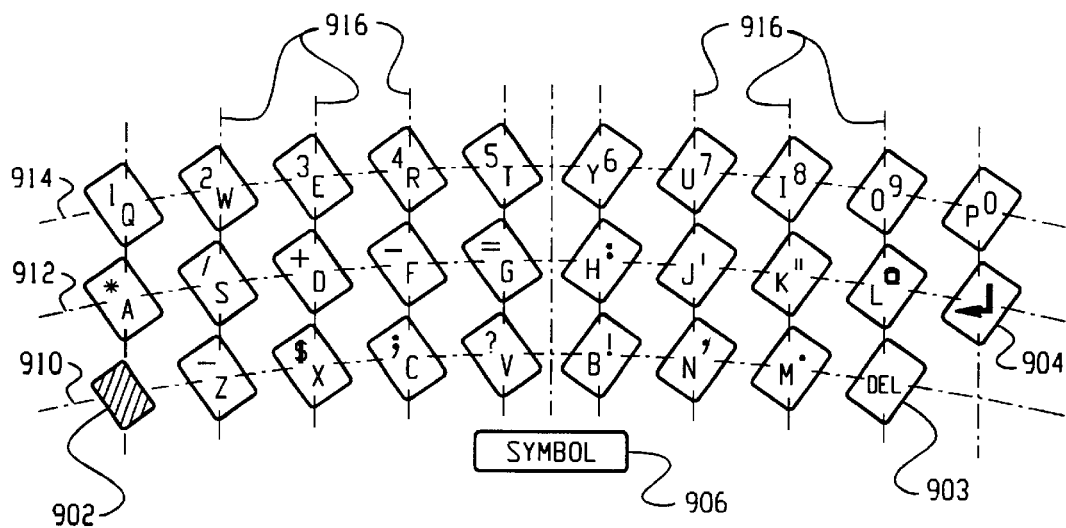
FIG. 11 is a diagram showing a seventh embodiment of a keyboard according to the present invention.

FIG. 11 is a diagram showing a seventh embodiment of a keyboard according to the present invention. This embodiment is similar to the embodiments shown in FIGS. 5, 7 and 9, except that the keys 901 are rectangular instead of ovals, circles, or squares.

Figure 12:
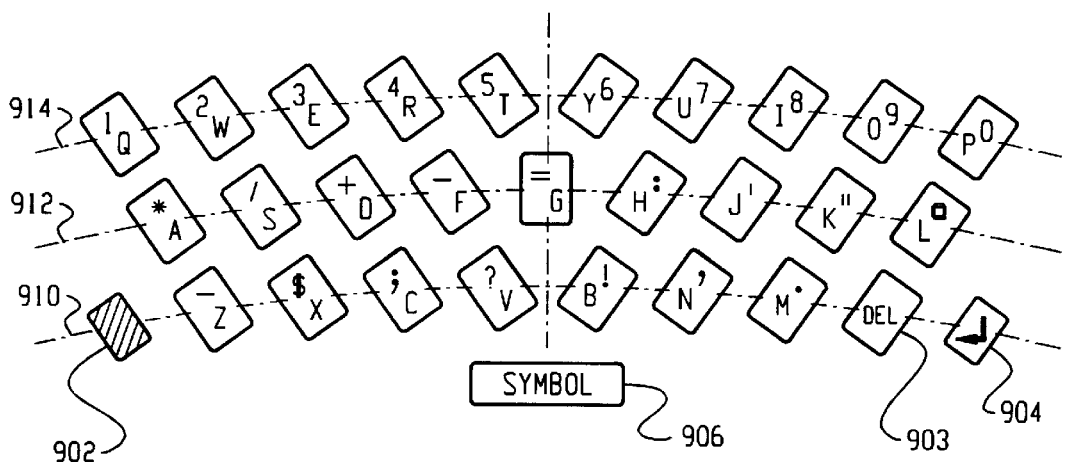
FIG. 12 is a diagram showing an eighth embodiment of a keyboard according to the present invention.
Figure 13A:
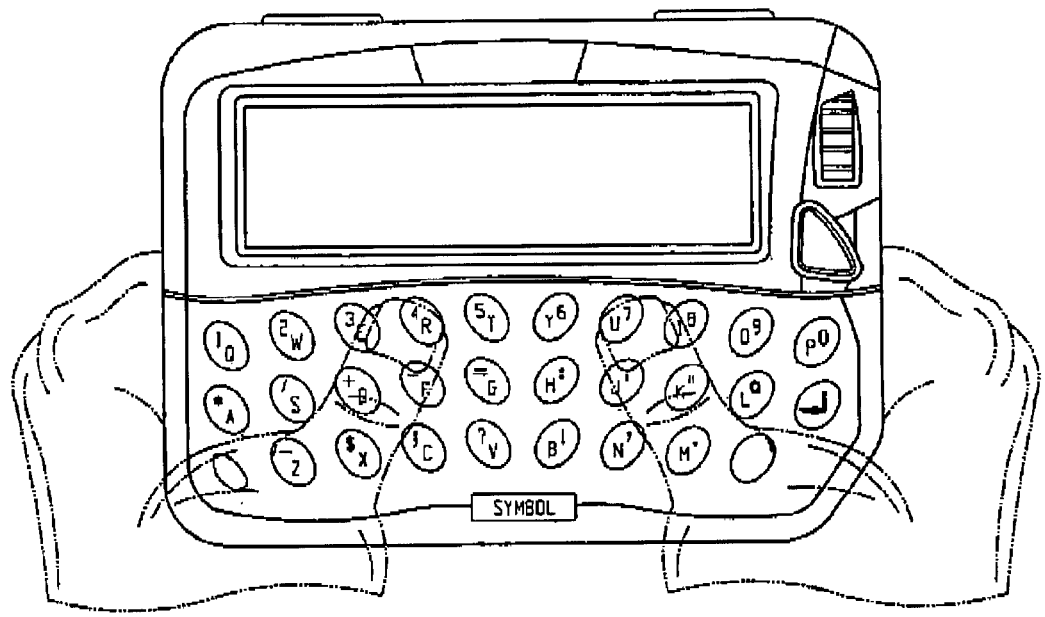
FIGS. 13a to 13f are diagrams illustrating the trajectory and radial movement of thumb typing using one electronic device; and, FIGS. 14a to 14c are diagrams showing an alternative electronic handheld device implementing one embodiment of the keyboard layout invention.
Figure 13B:
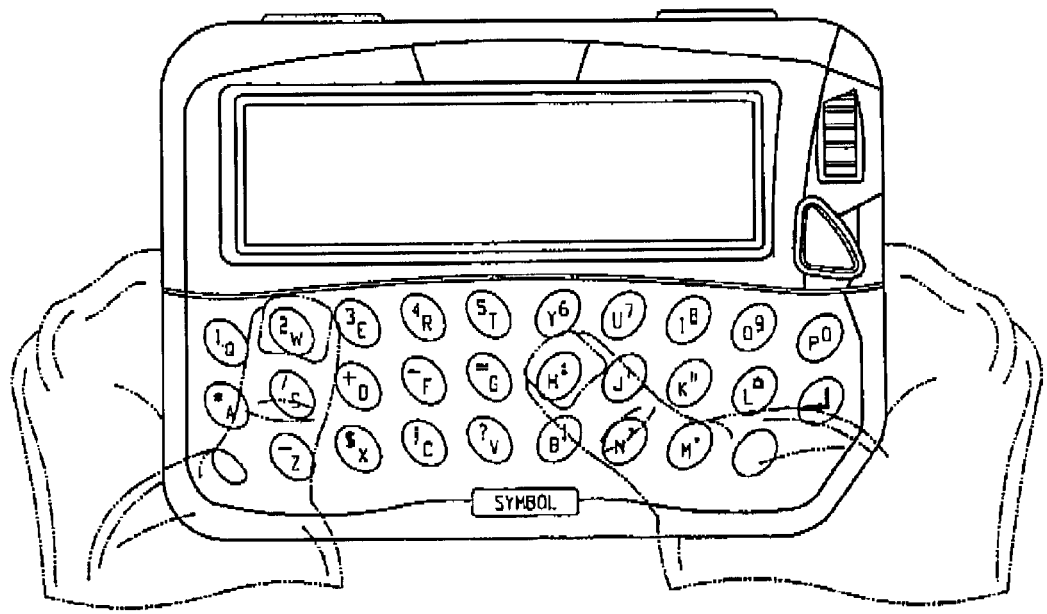
Figure 13C:
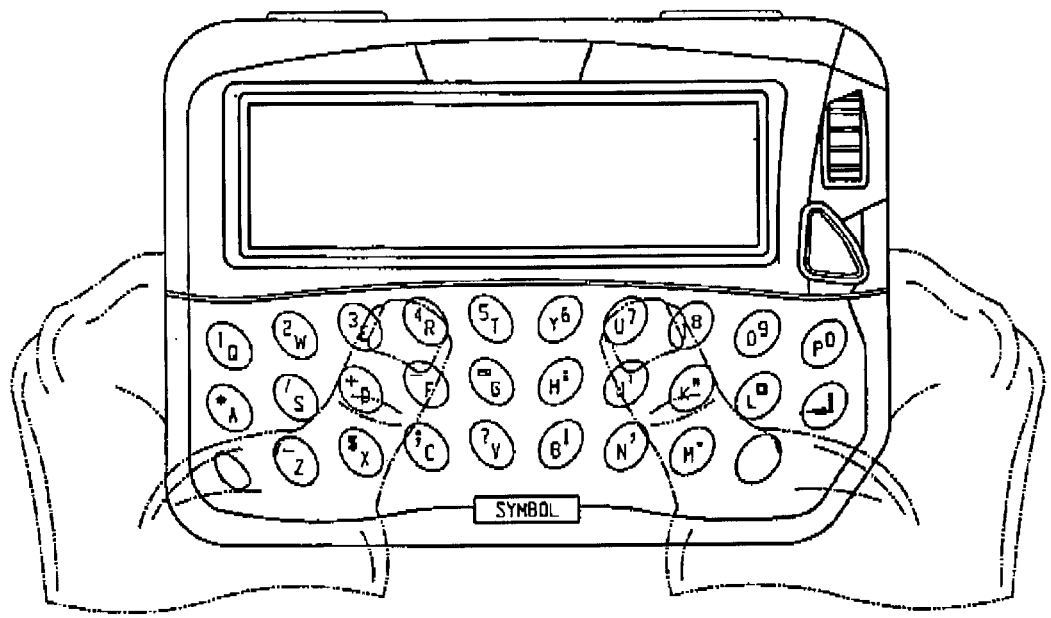
Figure 13D:
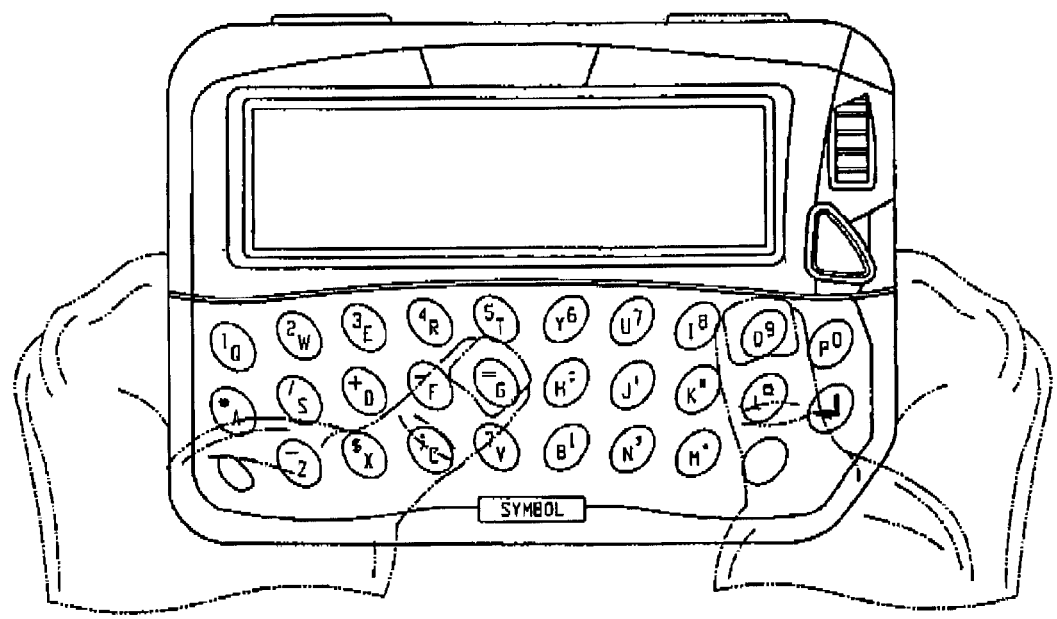
Figure 13E:
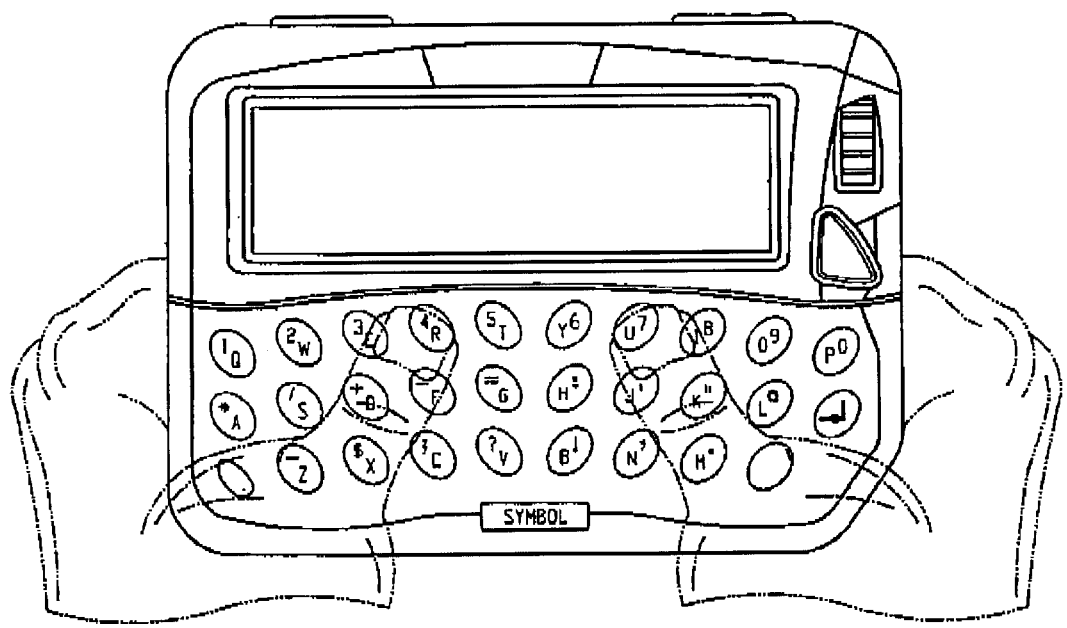
Figure 13F:
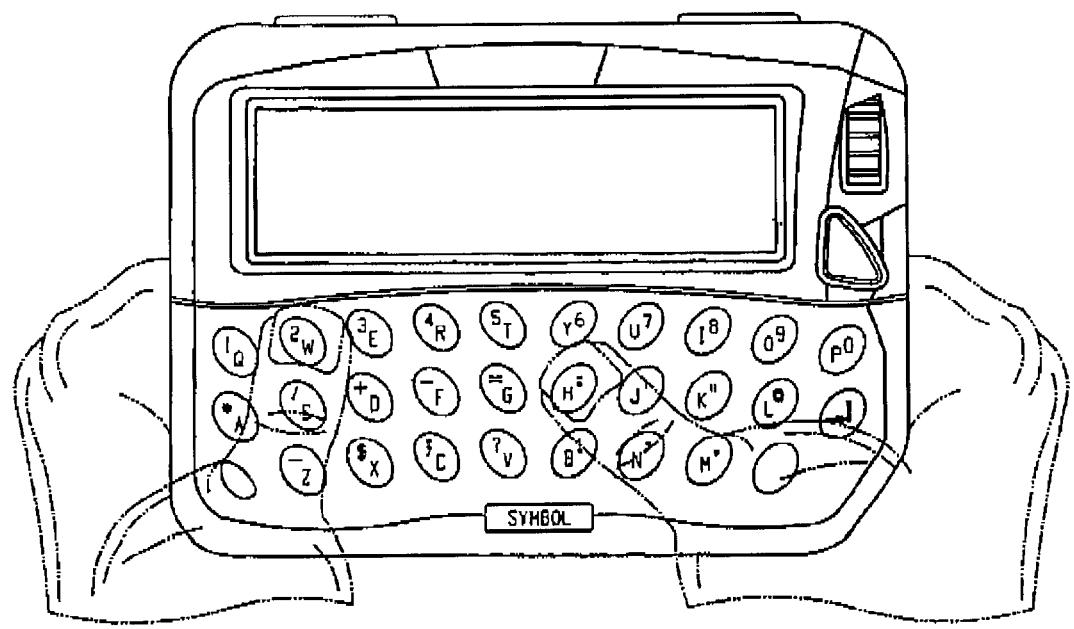
Figure 14C:
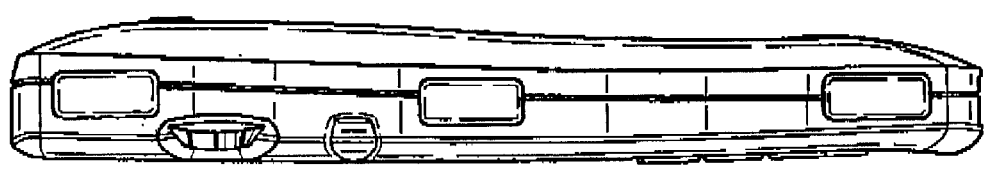
Figure 14A:
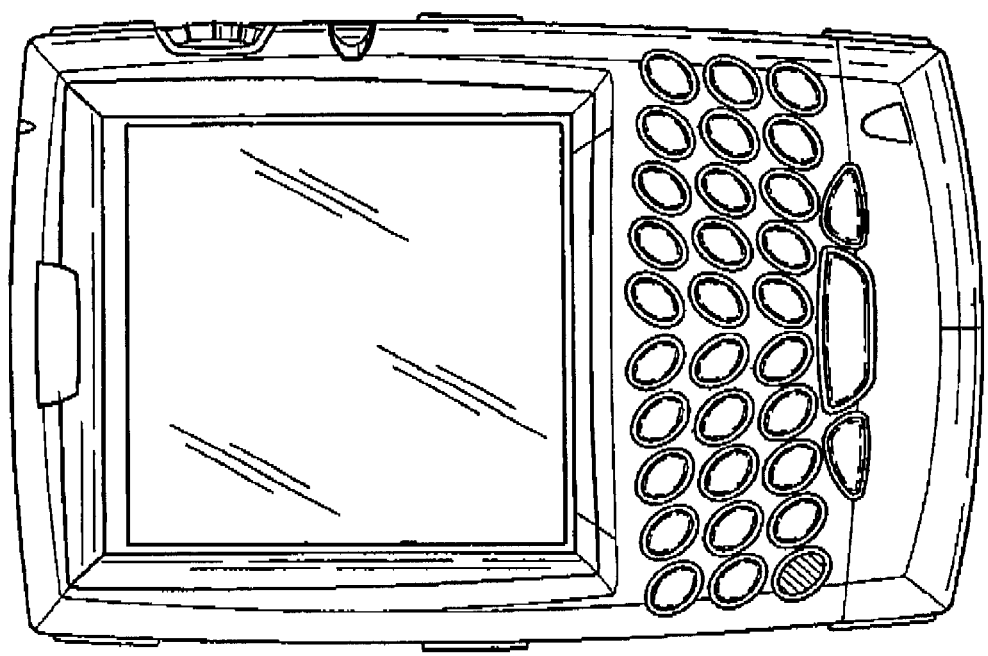
Figure 14B:
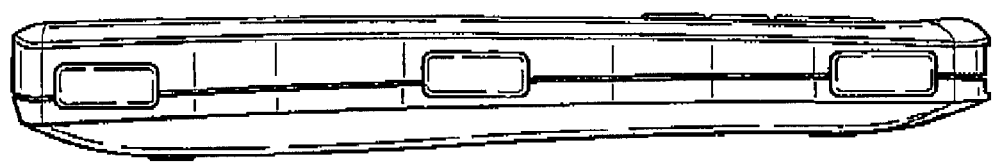

FIG. 12 is a diagram showing an eighth embodiment of a keyboard according to the present invention. This embodiment is similar to the embodiment shown in FIG. 11, except that the keys 901 are not aligned along the set of vertical references 916, but are staggered from one row to the next.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A miniature keyboard for use in a hand-held wireless messaging device, comprising:
   a plurality of oblong-shaped keys arranged in at least three arced rows to form a QWERTY-style keyboard;
   at least a plurality of the oblong-shaped keys in each row being tilted at an angle relative to a vertical reference extending from a top edge of the hand-held wireless messaging device to a bottom edge of the hand-held wireless messaging device;
   at least a plurality of the oblong-shaped keys in each row being offset along both a horizontal and a vertical axis from each of the keys in an adjacent row;
   a plurality of the oblong-shaped keys including a setter character and an alternate character; and
   the alternate characters including the numbers 1, 2, 3, 4, 5, 6, 7, 8, 9 and 0.

2. The miniature keyboard of claim 1, wherein the numbers 1, 2, 3, 4, 5, 6, 7, 8, 9 and 0 are included in a top row of oblong-shaped keys.

3. The miniature keyboard of claim 1, wherein the arced rows include a first row and a second row, wherein the arc defined by the first row has a lesser radius than the arc defined by the second row.

4. The miniature keyboard of claim 3, wherein the arced rows include a third row, wherein the arc defined by the third row has a greater radius than the arc defined by the second row.

5. The miniature keyboard of claim 1, wherein the miniature keyboard is positioned adjacent to a display on a front surface of the hand-held wireless messaging device.

6. The miniature keyboard of claim 1, wherein the hand-held wireless messaging device is a personal digital assistant (PDA).

7. The miniature keyboard of claim 1, wherein the hand-held wireless messaging device is a cellular telephone.

8. The miniature keyboard of claim 1, wherein at least one of the oblong-shaped keys is centrally located on the miniature keyboard.

9. The miniature keyboard of claim 1, wherein the centrally located oblong-shaped key is not tilted at an angle relative to the vertical reference.

10. The miniature keyboard of claim 1, further comprising:
    a plurality of function keys arranged below the QWERTY-style keyboard.

11. The miniature keyboard of claim 1, wherein the plurality of oblong-shaped keys are oval.

12. The miniature keyboard of claim 1, wherein the plurality of oblong-shaped keys are rectangular.

13. The miniature keyboard of claim 1, wherein the oblong-shaped keys are tilted at or about a 40 degree angle relative to the vertical reference.

14. The miniature keyboard of claim 1, wherein a plurality of the oblong-shaped keys are tilted at a positive angle relative to the vertical reference and a plurality of the oblong-shaped keys are tilted at a negative angle relative to the vertical reference.

15. The miniature keyboard of claim 1, wherein the arced rows are concentric.

16. A hand-held wireless messaging device including a miniature keyboard, the miniature keyboard comprising:
    a plurality of keys arranged in at least three arced rows to form a QWERTY-style keyboard;
    at least a plurality of the keys in each row being tilted at an angle relative to a vertical reference extending from a top edge of the hand-held wireless messaging device to a bottom edge of the hand-held wireless messaging device;
    a plurality of the keys including a letter character and an alternate character; and
    the alternate characters including the numbers 1, 2, 3, 4, 5, 6, 7, 8, 9 and 0.

17. The handheld wireless messaging device of claim 16, wherein the numbers 1, 2, 3, 4, 5, 6, 7, 8, 9 and 0 are included in a top row of keys.

18. The handheld wireless messaging device of claim 16, wherein the arced rows include the first row and a second row, wherein the arc defined by the first row has a lesser radius than the arc defined by the second row.

19. The handheld wireless messaging device of claim 18, wherein the arced rows include a third row, wherein the arc defined by the third row has a greater radius than the arc defined by the second row.

20. The handheld wireless messaging device of claim 16, wherein the miniature keyboard is positioned adjacent to a display on a front surface of the hand-held wireless messaging device.

21. The handheld wireless messaging device of claim 16, wherein the hand-held wireless messaging device is a personal digital assistant (PDA).

22. The handheld wireless messaging device of claim 16, wherein the hand-held wireless messaging device is a cellular telephone.

23. The handheld wireless messaging device of claim 16, wherein at least one of the keys is centrally located on the miniature keyboard.

24. The handheld wireless messaging device of claim 23, wherein the centrally located key is not tilted at an angle relative to the vertical reference.

25. The handheld wireless messaging device of claim 16, further comprising:
   a plurality of function keys arranged below the QWERTY-style keyboard.

26. The handheld wireless messaging device of claim 16, wherein the plurality of keys are oblong-shaped.

27. The handheld wireless messaging device of claim 26, wherein the plurality of oblong-shaped keys are oval.

28. The handheld wireless messaging device of claim 26, wherein the plurality of oblong-shaped keys are rectangular.

29. The handheld wireless messaging device of claim 26, wherein the oblong-shaped keys are tilted at or about a 40 degree angle relative to the vertical reference.

30. The handheld wireless messaging device of claim 26, wherein the plurality of the oblong-shaped keys are tilted at a positive angle relative to the vertical reference and a plurality of the oblong-shaped keys are tilted at a negative angle relative to the vertical reference.

31. The handheld wireless messaging device of claim 16, wherein the arced rows are concentric.

* * * * *